United States Patent [19]

Hargrove et al.

[11] 4,423,482

[45] Dec. 27, 1983

[54] FIFO REGISTER WITH INDEPENDENT CLOCKING MEANS

[75] Inventors: Arthur K. Hargrove, Irvine; Ronald L. Brown, Fountain Valley, both of Calif.

[73] Assignee: Sperry Corporation, New York, N.Y.

[21] Appl. No.: 268,791

[22] Filed: Jun. 1, 1981

[51] Int. Cl.[3] .............................................. G06F 5/06
[52] U.S. Cl. ................................................. 364/200
[58] Field of Search .......................... 371/16, 20–22; 364/200 MS File, 900 MS File

[56] References Cited

U.S. PATENT DOCUMENTS

| | | | |
|---|---|---|---|
| 3,940,743 | 2/1976 | Fitzgerald | 364/200 |
| 4,143,418 | 3/1979 | Hodge et al. | 364/200 |
| 4,204,251 | 5/1980 | Brudevold | 364/200 |
| 4,214,305 | 7/1980 | Tokita et al. | 364/200 |
| 4,225,919 | 9/1980 | Kyv et al. | 364/200 |
| 4,263,650 | 4/1981 | Bennett et al. | 364/200 |
| 4,271,518 | 6/1981 | Birzele et al. | 364/200 |
| 4,318,174 | 3/1982 | Suzuki et al. | 364/200 |

Primary Examiner—Jerry Smith
Assistant Examiner—Gary V. Harkcom
Attorney, Agent, or Firm—G. Donald Weber, Jr.; Eugene T. Battjer

[57] ABSTRACT

There is described a register circuit which is utilized with a system having the capability of interfacing between two data processing units which may have different operating speeds or data rate handling capabilities. The register permits writing and reading of data in a manner which is independent of the operating speed of the processing unit. The register provides pointers which selectively permit reading and/or writing in a prescribed manner but, at the same time, prevents writing or reading in a forbidden condition (i.e., writing in a full register or reading from an empty register).

18 Claims, 3 Drawing Figures

FIFO REGISTER WITH INDEPENDENT CLOCKING MEANS

BACKGROUND

1. Field of the Invention

This invention is directed to computing system, in general, and to control units for permitting computing systems of different capabilities to interface on a meaningful basis, in particular.

2. Prior Art

There are many known computing systems which utilize the capabilities of different types of units or subsystems. For example, many computing systems use microprocessors for certain portions of their operating repertoire and mini-computers for other portions thereof. The microprocessors and minicomputers frequently have different operating capabilities, such as, but not limited to, data throughput or operating speed. Inasmuch as the devices or system portions have different operating speeds, it is frequently impossible for these devices to exchange information directly. Typically, the system portions must therefore, interface through some intermediate system portion such as a register or the like. However, this arrangement has its own shortcomings.

For example, in the past one method of handling this problem has been to use an ordinary RAM for storing the information or data. A pointer is then used to keep track of the memory location which is being accessed for reading while another pointer is used to keep track of the memory address or location which is being accessed for writing. The difficulty with this operation is that the system effectively stops functioning in that, when the pointer is pointing to the RAM location for writing, the writing operation takes place. However, after the writing operation has taken place, the system must stop and the information stored in the RAM must then be read at the appropriate time in conjunction with the read pointer. Thus, the operation is effectively (1) load the RAM from one side, (2) stop, (3) read the RAM from the other side. The difficulty and the expense in system operating time in this situation is clear. That is, the read and write operations cannot be carried out at the same time.

Another technique which is being used is the so-called "bubble through" pointer technique. In this system, the data is loaded into the RAM at one end, or side, and propagated through the RAM by means of a self-clocking arrangement. The data, after propogation through the RAM, then sits at the output until the data is clocked out. In theory, this system permits data to be loaded in and read out of the memory at the same time (as controlled by the clocking apparatus). However, this technique is notoriously slow. For example, the data has a definite time requirement in propagating from one side of the RAM to the other. Thus, the RAM becomes the pacing or limiting item in the system from a timewise characteristic. Clearly, each of these systems is fraught with shortcomings and frailties wherein it is highly desirable to improve upon this portion of the computing system.

SUMMARY OF THE INVENTION

This invention is a special pointer register which is used with a system having two interfacing system portions which have different operating speeds. This register permits data to be clocked into one side of a RAM or register, and, as well, to be clocked out of the other end of the register or RAM in a "first-in, first-out" (FIFO) manner. Basically, the system gives the appearance of one or more logic blocks which resemble D-type flip-flops. Each of the logic blocks is independently clocked. The system is initialized to store a prescribed code therein. The circuit then is operated upon to interpret the initialized condition and to copy a portion of the coded data into the next logic block. The coded data is then interrogated or tested to determine what, if any, activity can next be taken. Under appropriate conditions, the copying operation continues. With the sensing of prescribed coded conditions, the operation of the register is specifically controlled. For example, the register prevents the writing of data into a full memory register or the reading of data or information from an empty memory or register. Of course, in the absence of one of these unacceptable conditions, the register will continue to function and to clock data from the input end to the output end at its own rate of speed which is independent of either the input or the output device. Moreover, the reading and writing operations can take place in the same register on a basically random arrangement so long as the forbidden or unacceptable conditions noted above are avoided.

DESCRIPTION OF A PREFERRED EMBODIMENT

Figure 1:
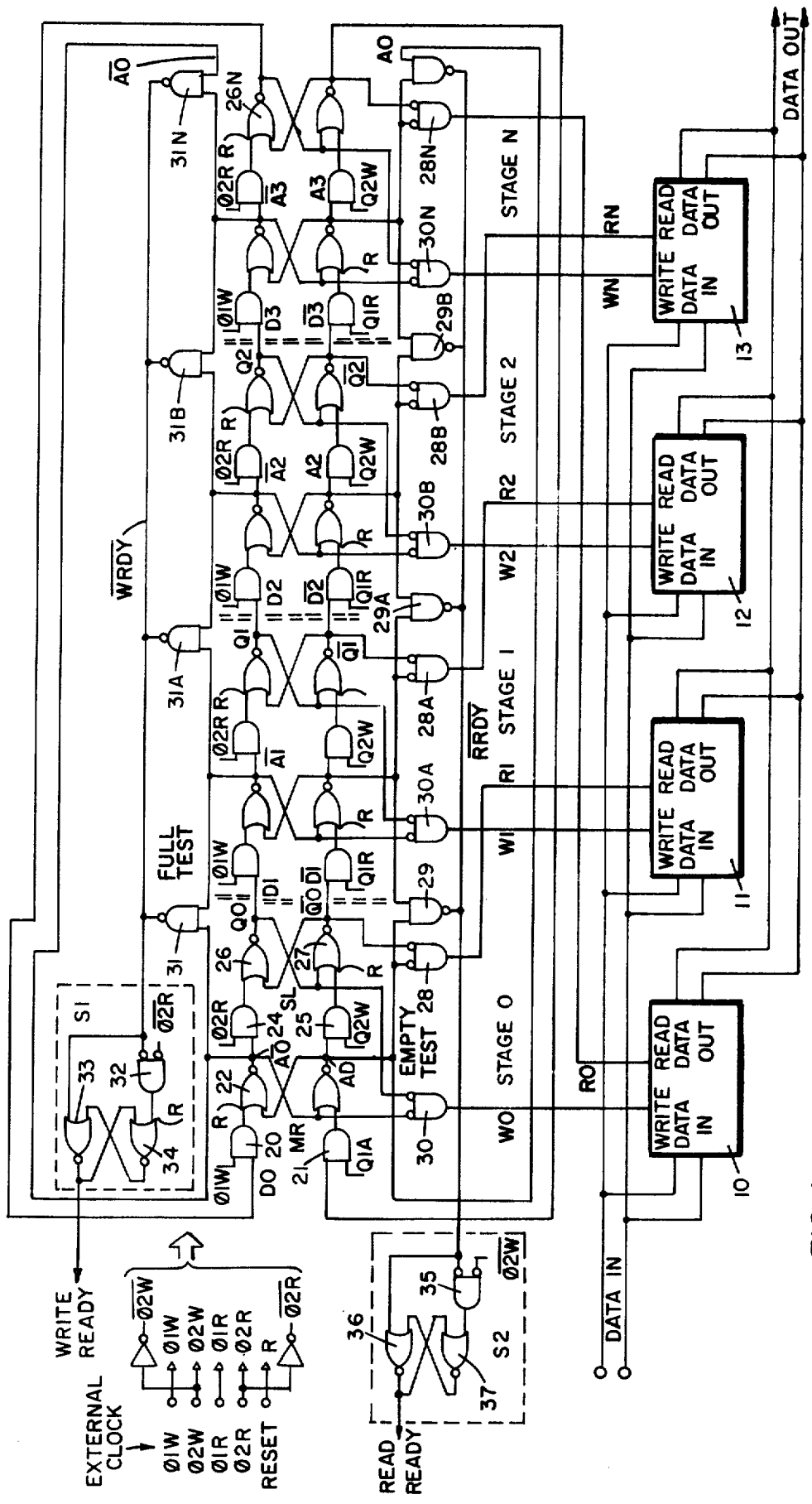
FIG. 1 is a schematic representation of a preferred embodiment of the instant invention.

Referring now to FIG. 1, there is shown a schematic representation of a preferred embodiment of the instant invention. In this representation, the circuit comprises four logic blocks. However, it must be understood that the register will work with any number desired so long as certain coded modifications are taken into account and implemented. Of course, it should be noted that a register having less than three logic blocks would have questionable systems utility or efficiency, but could be provided. The maximum number of logic blocks is indeterminate at this time but could be limited by speed or power.

Each of the stages is identified as that circuit portion between the dashed lines. The stages are designated as stage 0, stage 1, stage 2, and stage N. Any number of additional stages can be inserted between the double dashed lines, (i.e. between stages 2 and N), in accordance with limitations noted above.

Each of the stages is substantially similar in construction and configuration. That is, each stage comprises a master circuit (MR) and a slave circuit portion (SL). For convenience, only one of these circuits will be described in significant detail here. However, each of the stages is similarly operative.

Each of the stages includes a pair of input AND gates 20 and 21 which are associated with the write function and the read function, respectively. Gate 20, in particular, receives an input data signal DO and a write control signal $\phi1W$, which is the phase 1 write signal as described hereinafter. The output signals of the input gates 20, 21 are connected to the input terminals of the cross-connected NOR gates 22 and 23, respectively. That is, the output terminals of gates 22 and 23 are cross-coupled to the other input terminals of the opposite gate. In particular, gate 22 is connected to 23 and gate 23 is connected to gate 22. In addition, gate 22 receives the reset signal R for resetting or initialization as described hereinafter. The output of gate 22 is further connected to the input terminal of the read gate 24 while the output of gate 23 is connected to the input of the write AND gate 25. In addition, the output of gate 22 is connected to an input of AND gate 30 while the output of gate 23 is connected to the input of AND gate 28 and NAND gate 29.

AND gate 24 also receives as an input signal the $\emptyset 2R$ input signal, which is the phase 2 read signal, while AND gate 25 receives the $\emptyset 2W$ input signal. The output terminals of gates 24 and 25 are connected to input terminals of NOR gates 26 and 27, respectively, which are cross-coupled as shown. Thus, the output of gate 26 is connected to the input of gate 27 and to the other input of AND gate 30. Similarly, the output of gate 27 is connected to an input of gate 26 and to another input of gate 28. The output terminals of gates 26 and 27 are further connected to the input gates in the next connected stage wherein the configuration of stage 1 is, as noted, substantially similar to the configuration of stage 0. Likewise, the second terminal of NAND gate 29 is connected to the output of the cross-coupled gate in the master portion of stage 1 as shown. Also, gate 27 has the reset signal R connected thereto.

Each of the output stages is also connected to an input terminal of NOR gate 31, which is connected to the WRITE READY ($\overline{WRDY}$) line. The $\overline{WRDY}$ line is connected to the input of synchronizer S1 which includes AND gate 32 which also receives the $\emptyset 2R$. The output of gate 32 is supplied to one input of NOR gate 34 which gate also receives the reset signal and the output of gate 33. The gate 33 receives, as inputs, the output of gate 34 and the signal $\overline{WRDY}$ (on line $\overline{WRDY}$) as noted above. The output of synchronizer S1 is the WRDY signal which is supplied to external control or computer circuitry as noted hereinafter.

A similar synchronizer circuit S2 includes AND gate 35 which has one input connected to the $\overline{RRDY}$ line and another input terminal which is connected to receive the $\emptyset 2W$ signal. NOR gate 37 receives the input signals from the output terminal of gate 35 and from an output terminal of gate 36. Gate 36 receives, as input signals, the $\overline{RRDY}$ signal and the output of gate 37. The output signal produced by gate 36, i.e., the output of synchronizer circuit S2, is the $\overline{RRDY}$ signal which is supplied to the control circuitry noted above and discussed hereinafter.

A plurality of storage elements 10, 11, 12 and 13 are shown. These storage elements may be dual port RAMS, buffers or any other suitable storage device. Each of the storage elements has a pair of data input terminals which are connected to a data-in bus and a pair of data output terminals which are connected to a data-out bus. Consequently, data applied on the data-in bus from the external circuitry is supplied in parallel to each of the storage elements. Likewise, each of the storage elements may supply output signals to the external circuitry along the data-out. Moreover, each of the storage elements includes a write terminal and a read terminal wherein the application of a proper control signal activates the storage element for either reading from the data-in bus or writing on the data-out bus. For example, gate 30 produces the write signal W0 which is supplied from stage zero to the write terminal of storage element 10. In addition, the read terminal of storage element 10 receives the R0 signal from the output AND gate 28N of the slave portion of stage N. Likewise, storage element 11 receives the write signal W1 from gate 30A of the master portion of the circuit in stage 1 while the read signal R1 is applied by output AND gate 28 of the slave portion of the circuit in stage 0. As is seen, the generalized rule is that the storage element receives the write signal from the associated stage and the read signal from the preceding stage.

Figure 3:
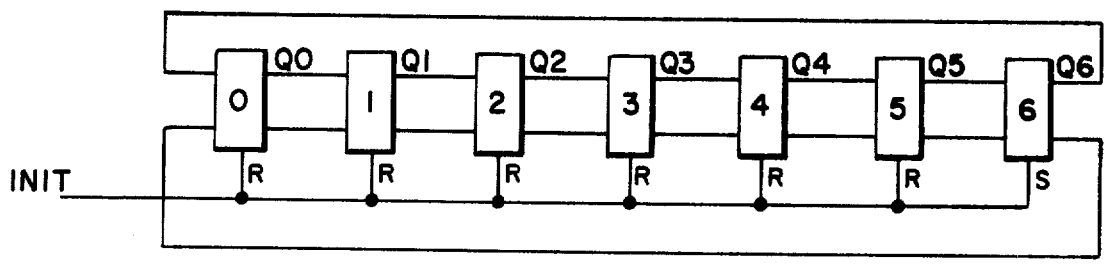
FIG. 3 is a schematic representation of the operation of the pointer portion of the circuit together with a chart of the signal conditions therein.

Referring now to FIG. 3, there is shown a simplified block diagram of the circuit involving the instant invention which simplified diagram is helpful in understanding the operation of the circuit. In the block diagram seven stages are shown. These stages are similar to the stages 0 through N as shown in FIG. 1. The stages are shown to have the outputs thereof connected to the inputs of the next adjacent stage with the output of the last stage connected to the inputs of the first stage to provide a ring or circular queue arrangement. In addition, the initialization signal (INIT) is supplied along a common line. The initialization signal is supplied to the reset terminal R of stages 0 throught 5 and to the set terminal of stage 6. Thus, with the application of the INIT signal, the status of the various stages is established. In the embodiment described herein, the INIT signal will cause the outputs of stages 0 through 5 to be a zero while the output of stage 6 will be a 1 where the output signals are detected at the Q output terminal (rather than the $\overline{Q}$ output terminal). Thus, with the application of the INIT signal, the output Qn signals are as shown in the table portion of FIG. 3.

The basic thrust of the invention is that the application of a write signal (see FIG. 1) causes the circuit to operate such that the stage which is adjacent to a stage having a 1 stored therein copies the 1 into the adjacent stage. Thus, with the application of the write signal as shown in the table, the 1 which was stored in stage 6 and produced as an output signal Q6 (in response to the INIT signal, for example) is now copied into stage 0 wherein the output signal Q0 is a 1. However, the other signals remain zero.

This operation is continued in sequence, as is clear from the table, wherein the binary 1 is copied by the next adjacent stage so that a 1 is copied into stage 2, and then into stage 3, and then into stage 4, and so forth. However, it will be noted that in the fifth application of the write signal, the 1 is copied into stage 4 and the output signal Q4 is produced. At this juncture, the circuit will produce a signal (Write Ready=0) (see FIG. 1) which indicates that the register is now full and no further writing should be initiated. While it would appear that stage 5 is not full, it is essential to maintain the zero in this stage in order to permit a read cycle to occur. That is, as in the case of a write signal causing the next adjacent stage to copy the 1 from the preceding stage, a read signal causes the next adjacent stage to copy the zero from the preceding stage. Thus, with the application of the first READ signal, the zero in stage 5, i.e., the signal Q5, is copied into stage 6. This operation continues until zeros have been copied into each of the stages, except one, which stage retains a binary 1 therein and indicates an EMPTY condition.

If all ones were copied into the stages, it would be impossible to initiate a read operation because there would be no zeros to copy. Likewise, if zeros were copied into all the stages, it would be impossible to initiate a write operation because there would be no ones to copy. The detection of the FULL and EMPTY conditions is accomplished by the circuitry shown in FIG. 1. Nevertheless, it is important to understand that an initialization operation is provided when the circuit operation is begun, which initialization causes a 1 to be stored in one of the stages. Moreover, with this initialization condition, it is essential that a write operation be implemented before a read operation because a read operation will destroy the single one in the register. This operation is assured with the circuit configuration shown in FIG. 1. The operation of the circuit can, of course, be reversed if opposite polarity logic is desired and/or required.

Figure 2:
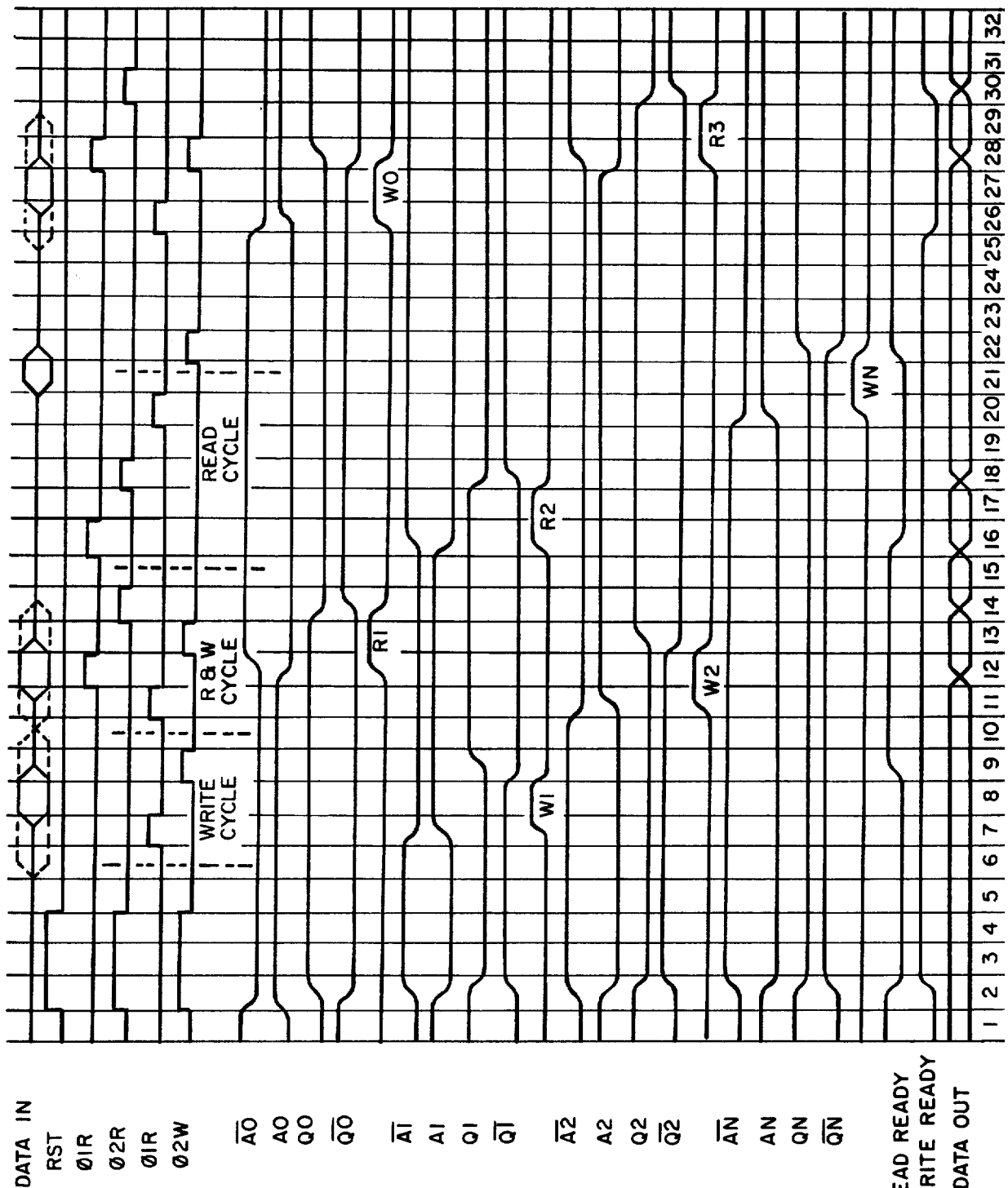
FIG. 2 is a graphic representation of the wave forms of the signals in the circuit.

Referring now to FIGS. 1 and 2 concurrently, the circuit of the instant invention is described. Initially, the circuit is powered up and the initialization or reset signal INIT is supplied at time periods T2-T4. This signal is applied to the reset (R) terminals of the respective gates, such as gates 22, 27, 22A, 27A and so forth. The INIT signal will cause the output signals Q1, Q2 and so forth to QN to be set to a zero state while output signal Q0 is set to the binary 1 state by time period T3. This is apparent inasmuch as gates 23N and 26N receive reset signals in stages 1 to N whereas in stage 0 the reset signal is applied to gates 22 and 27. Thus, the signals at terminals Q1 to QN are zeros while the signal at terminal Q0 is a 1.

Having now initialized the circuit, the first operation to be performed is a write operation. Thus, the write signals ∅1W and ∅2W are supplied. These positive going signals are applied at the appropriate terminals of AND gates 20, 20A, 20B, and so forth, and gates 25, 25A, 25B, and so forth, respectively, in timed sequence. In particular, the ∅2W signal is supplied at time period T2 which, effectively, prevents a read operation by keeping the RRDY signal low (see synchronizer circuit S2). Thereafter, the ∅1W and ∅2W signals are applied, in sequence, to provide write operations. For example, application of the ∅1W signal at time periods T7 and T11 together with the ∅2W signal at time periods T9 and T13 produce write operations in the FIFO register. See, for example, the write signals W1 and W2 at time periods T8 and T12. These signals have the effect of causing the respective stages to copy the signal at the stage adjacent thereto and at the left hand side thereof. Thus, the binary 1 at terminal Q0 is copied into stage 1 and now appears at terminal Q1 at time period T10. This situation will be discussed subsequently.

In a similar fashion, after a write function has occured, a read function can occur. That is, the signals ∅1R and ∅2R are supplied to gates 24, 24A, 24B and so forth as well as to gates 21, 21A, 21B and so forth in timed sequence. In particular, the read signal ∅2R is supplied at time period T2 which delays the operation of synchronizer S1 until after a read operation is completed. A read operation is controlled by application of the ∅1R and ∅2R signals at time periods T12 and T14, respectively, as well as other time periods, of course. These signals are arranged to copy the zeros from the next adjacent stage to the left into the stage in question. Again, this operation is discussed supra, relative to FIG. 3.

In determining whether a "full" condition exists, the gates 31, 31A, 31B, and so forth, are utilized. That is, the inputs of these AND gates are connected to adjacent stages in the FIFO register. Thus, adjacent stages are interrogated and the status thereof detected and determined. The outputs of these NAND gates are connected together as an OR gate arrangement and then connected to an input of synchronizer circuit S1. In the embodiment shown, so long as the output signal produced by one of the NAND gates 31, etc., is a low-level signal, the signal $\overline{WRDY}$ is a low-level signal and the write ready signal produced by synchronizer S1 is a high-level signal which is directed to the external circuitry to trigger a condition when writing into the storage elements 10 through 13 can take place.

Conversely, when the signal $\overline{WRDY}$ is positive, a write ready signal is not generated by synchronizer S1. A positive or high level $\overline{WRDY}$ signal is produced whenever the input signals supplied to gates 31, 31A and so forth, include at most one high-level input signal to each of the gates, indicating that only one Q signal is a zero or about to become a zero.

In a similar manner, the read ready signal ($\overline{RRDY}$) is generated at the outputs of gates 29, 29A, 29B and so forth. Again, these gates are connected to span or interrogate a pair of adjacent stages in the FIFO. A similar operation occurs relative to the input and output signals. The output signals $\overline{RRDY}$ is supplied to synchronizer circuit S2 and controls the read ready signal RRDY produced by synchronizer S2.

It is noted that the synchronizer circuits both operate in a similar fashion and specifically control the operation of the circuit. In particular, in the case of synchronizer S1, the synchronizer is operative as soon as the FIFO begins the cycle wherein it is attempting to write the last bit. The synchronizer begins immediately on ∅1W so that the last bit is not written into the FIFO register inasmuch as this FULL condition is undesirable and once the register is FULL it is too late to correct the undesirable writing condition. In other words, the write ready signal WRDY must be terminated to prevent the external computer circuitry from attempting to write in signals to the storage elements.

Conversely, if the buffer is full, the write operation is delayed until at least one read operation is performed. Thus, the read cycle signal ∅2R is used to control synchronizer S1 by delaying its output until after the read cycle has completed. The $\overline{WRDY}$ signal is removed as soon as the system begins to write the last word or data information before a FULL condition and further delays bringing the WRDY signal up until after the completion of at least one read cycle.

The RRDY signal produced by synchronizer S2 operates in a similar fashion. That is, the RRDY signal is switched low on the ∅1R read signal which would produce an EMPTY condition and the synchronizer S2 delays bringing up the RRDY signal until the completion of the first write cycle on ∅2W.

Although the discussion has separated read and write operations, both may be done simultaneously provided a full or empty condition does not occur. In particular, the uniqueness of the invention is in that read and write operations may occur simultaneously with the provision that ∅1R and ∅2R or ∅1W and ∅2W do not overlap (i.e., are separated in time). The read signals (∅1R and ∅2R) do not have to bear any particular relationship to the write signals (∅1W and ∅2W) other than (1) at least one write operation occurs after the initialization before the first read operation; (2) that more read operations than write operations do not occur (i.e., no reads past empty); and (3) that no write operations occur after a full condition until the full condition is removed either by a read operation or a new initialization. The more separation of a ∅1 signal from its respective ∅2 signal for both read and write guarantees the independence of read and write clocking. This allows data transfer from one system or subsystem to another system or subsystem, independent of the clocking rates of each system within the constraints of the full and empty register. Typically, the slow system would transfer continuously while the fast system would transfer in bursts where the number of words in a burst and the frequency of the bursts depend, in part, on the size N of the FIFO.

Thus, there is shown and described a preferred embodiment of the invention. However, it must be understood that other modifications or arrangements can be made. For example, the type of logic can be changed and/or inverted. This might require different logic circuits and gates. Nevertheless, the basic operations and characteristics would be retained. Any such modifications or changes which fall within the scope or purview of this description are intended to be included therein as well. This description is intended to be illustrative only and is not intended to be limitative. Rather, the scope of the invention is limited only by the claims appended hereto.

Having thus described a preferred embodiment of the invention, what is claimed is:

1. A register circuit for interfacing between two data processors which may have different operating speeds, comprising,
   a plurality of independently clocked stages which can store binary signals therein,
   clock means connected to each of said stages in order to activate said stages at prescribed times,
   initializing means for supplying a pulse to each of said stages for simultaneously setting all of said stages to prescribed conditions with at least one of said stages set to a different condition than all of the other stages,
   testing means for continuously determining the conditions in said stages and supplying control signals to said data processors to control the operation thereof relative to said register circuit,
   synchronizer means connected to said testing means for selectively permitting said stages to be operated only at specified times,
   register means controlled by said stages to selectively pass data between said data processors through said register means, and
   data bus means connected to said register means to receive or supply data in accordance with the conditions of said register means.

2. The register circuit recited in claim 1 wherein, each of said stages includes logic circuit means selectively settable to store said binary signals.

3. The register circuit recited in claim 1 wherein, said stages produce pointer signals which are supplied to said register means to control the data flow therethrough.

4. The register circuit recited in claim 1 wherein, said stages produce signals which indicate the the status to the data processors in terms of whether data can be read therefrom or written thereto without said data being distorted.

5. The register circuit recited in claim 1 wherein, one of said stages is set to a binary one condition and the other stages are set to a binary zero condition as the prescribed conditions set by said initializing means.

6. The register circuit recited in claim 2 wherein, said logic circuit means include cross-coupled gate means for storing said binary signals.

7. The register circuit recited in claim 6 wherein, said cross-coupled gate means include a pair of cross-coupled gate circuits connected together.

8. The register circuit recited in claim 7 including, intermediate gate means connected to receive control signals,
said intermediate gate means further connected between said pair of cross-coupled gate circuits and arranged to control the operation of the cross-coupled gate means.

9. The register circuit recited in claim 1 wherein, said register means includes at least one storage element.

10. The register circuit recited in claim 9 wherein, said storage element comprises a RAM.

11. The register recited in claim 3 wherein, said pointer signal indicates whether said register circuit is in a read mode or a write mode and determines whether said register means receives or supplies data.

12. The register circuit recited in claim 1 including, data bus means connected to said register means to receive or supply data in accordance with the conditions of said register means.

13. The register circuit recited in claim 1 wherein, said stages are connected together to copy data from one stage into the next stage when activated by said clock means.

14. The register circuit recited in claim 13 wherein, the stage into which the data is copied is a function of the condition of said testing means.

15. The register circuit recited in claim 1 wherein, said testing means determines if the plurality of stages is in a full or an empty condition and provides a control signal representative of these conditions.

16. The register circuit recited in claim 15 wherein, said testing means includes a plurality of test gate means,
each said test gate means is connected to two adjacent stages to receive signals therefrom.

17. The circuit recited in claim 6 wherein, said cross-coupled gate means comprises a flip flop circuit.

18. The circuit recited in claim 8 wherein, said intermediate gate means is connected to said clock means.

* * * * *